US008226509B2

(12) United States Patent
Smart

(10) Patent No.: US 8,226,509 B2
(45) Date of Patent: Jul. 24, 2012

(54) TORQUE BIASED FRICTION HINGE FOR A TENSIONER

(75) Inventor: Michael Smart, Locke, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/336,508

(22) Filed: Dec. 23, 2011

(65) Prior Publication Data

US 2012/0094792 A1   Apr. 19, 2012

Related U.S. Application Data

(60) Division of application No. 12/278,439, filed as application No. PCT/US2007/060947 on Jan. 24, 2007, now Pat. No. 8,105,194, which is a continuation-in-part of application No. PCT/US2007/060941, filed on Jan. 24, 2007, and a continuation-in-part of application No. PCT/US2007/060945, filed on Jan. 24, 2007.

(60) Provisional application No. 60/765,777, filed on Feb. 7, 2006, provisional application No. 60/822,520, filed on Aug. 16, 2006, provisional application No. 60/863,815, filed on Nov. 1, 2006.

(51) Int. Cl.
*F16H 7/08* (2006.01)
(52) U.S. Cl. ........................ 474/111; 474/109
(58) Field of Classification Search .................. 474/101, 474/109, 111, 140
See application file for complete search history.

(56) References Cited

U.S. PATENT DOCUMENTS

| | | | |
|---|---|---|---|
| 2,191,946 | A | 2/1940 | Weller |
| 2,261,316 | A | 11/1941 | Weller |
| 3,370,476 | A | 2/1968 | Hill et al. |
| 3,985,379 | A | 10/1976 | Normark |
| 4,325,470 | A | 4/1982 | Bopp |
| 4,653,623 | A | 3/1987 | Demorest |
| 4,921,472 | A | 5/1990 | Young |
| RE34,616 | E | 5/1994 | Komorowskip et al. |
| 5,462,493 | A | 10/1995 | Simpson |
| 5,653,652 | A | 8/1997 | Simpson |
| 5,797,818 | A | 8/1998 | Young |
| 5,935,032 | A | 8/1999 | Bral |

(Continued)

FOREIGN PATENT DOCUMENTS

DE      1724655 U   6/1956

(Continued)

OTHER PUBLICATIONS

PCT Search Report; PCT/US2007/060945; May 3, 2007; 11 pages.

(Continued)

*Primary Examiner* — William E Dondero
(74) *Attorney, Agent, or Firm* — Brown & Michaels, PC

(57) ABSTRACT

A pivot joint for a single blade spring tensioner or double blade spring tensioner generates a biased friction loss at a pivot joint. The friction torque generated in one direction of joint rotation is greater than the friction torque generated in the opposite direction of rotation. In one embodiment, the direction of torque bias at the joints is used to make the damping of the blade spring greater in compression than in extension. High damping in compression and low damping in extension is a desirable characteristic for a tensioner in most applications. The device may be designed to act as a one-way clutch or as a two-way clutch. The device may also be designed to apply large friction torques only when the joint undergoes large amplitude motions (loss of control).

2 Claims, 12 Drawing Sheets

U.S. PATENT DOCUMENTS

| | | |
|---|---|---|
| 6,141,831 A | 11/2000 | Novin et al. |
| 6,264,578 B1 | 7/2001 | Ayukawa |
| 6,422,962 B1 | 7/2002 | Lehtovaara et al. |
| 6,428,435 B1 | 8/2002 | Kumakura et al. |
| 6,439,078 B1 | 8/2002 | Schlude et al. |
| 6,440,020 B1 | 8/2002 | Tada |
| 6,447,416 B1 | 9/2002 | Jacques et al. |
| 6,592,482 B2 | 7/2003 | Serkh |
| 6,612,953 B2 | 9/2003 | Tada |
| 6,699,148 B1 | 3/2004 | Taylor et al. |
| 2002/0045503 A1 | 4/2002 | Young et al. |
| 2002/0069539 A1 | 6/2002 | Tada |
| 2002/0162191 A1 | 11/2002 | Chen |
| 2003/0119616 A1 | 6/2003 | Meckstroth et al. |
| 2005/0059518 A1 | 3/2005 | Joslyn |
| 2005/0143207 A1 | 6/2005 | Hashimoto et al. |
| 2005/0176538 A1 | 8/2005 | Morita |

FOREIGN PATENT DOCUMENTS

| | | |
|---|---|---|
| DE | 1550752 A1 | 10/1969 |
| EP | 1045161 A2 | 10/2000 |
| EP | 1323949 A2 | 7/2003 |
| GB | 155646 A | 12/1920 |
| GB | 628803 A | 9/1949 |
| GB | 989582 A | 4/1965 |
| GB | 1077715 A | 8/1967 |
| GB | 2069656 A | 8/1981 |
| GB | 2259964 A | 3/1993 |
| JP | 1131324 A2 | 5/1989 |
| JP | 6010556 A2 | 1/1994 |
| JP | 6193693 A2 | 7/1994 |
| JP | 6193694 A2 | 7/1994 |
| JP | 8336809 A2 | 12/1996 |
| JP | 2001355688 A2 | 12/2001 |
| JP | 2002098205 A2 | 4/2002 |
| JP | 2005155795 A2 | 6/2005 |
| JP | 2005155796 A2 | 6/2005 |
| JP | 2005155833 A2 | 6/2005 |

OTHER PUBLICATIONS

PCT Search Report; PCT/US2007/060941; May 15, 2007; 10 pages.

PCT Search Report; PCT/US2007/060947; Aug. 27, 2008; 16 pages.

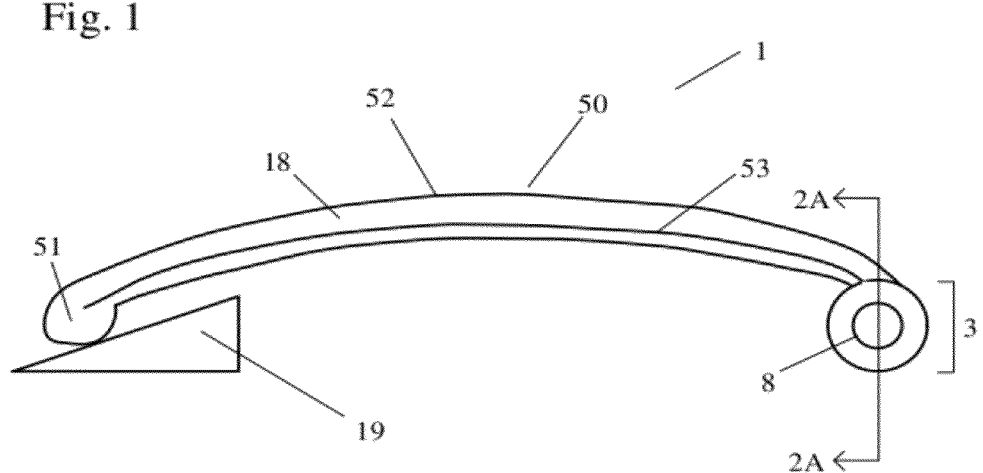
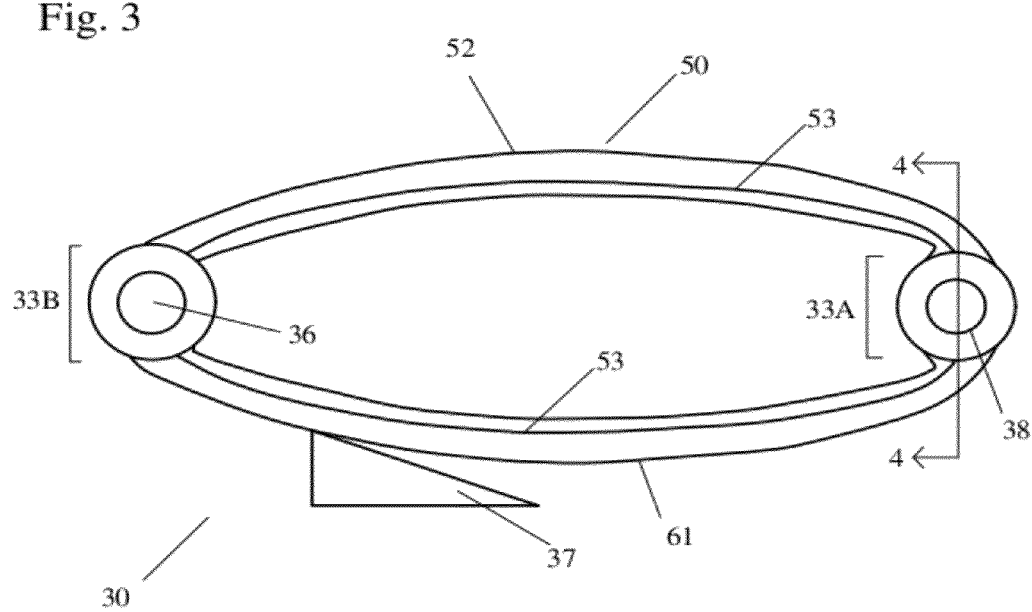

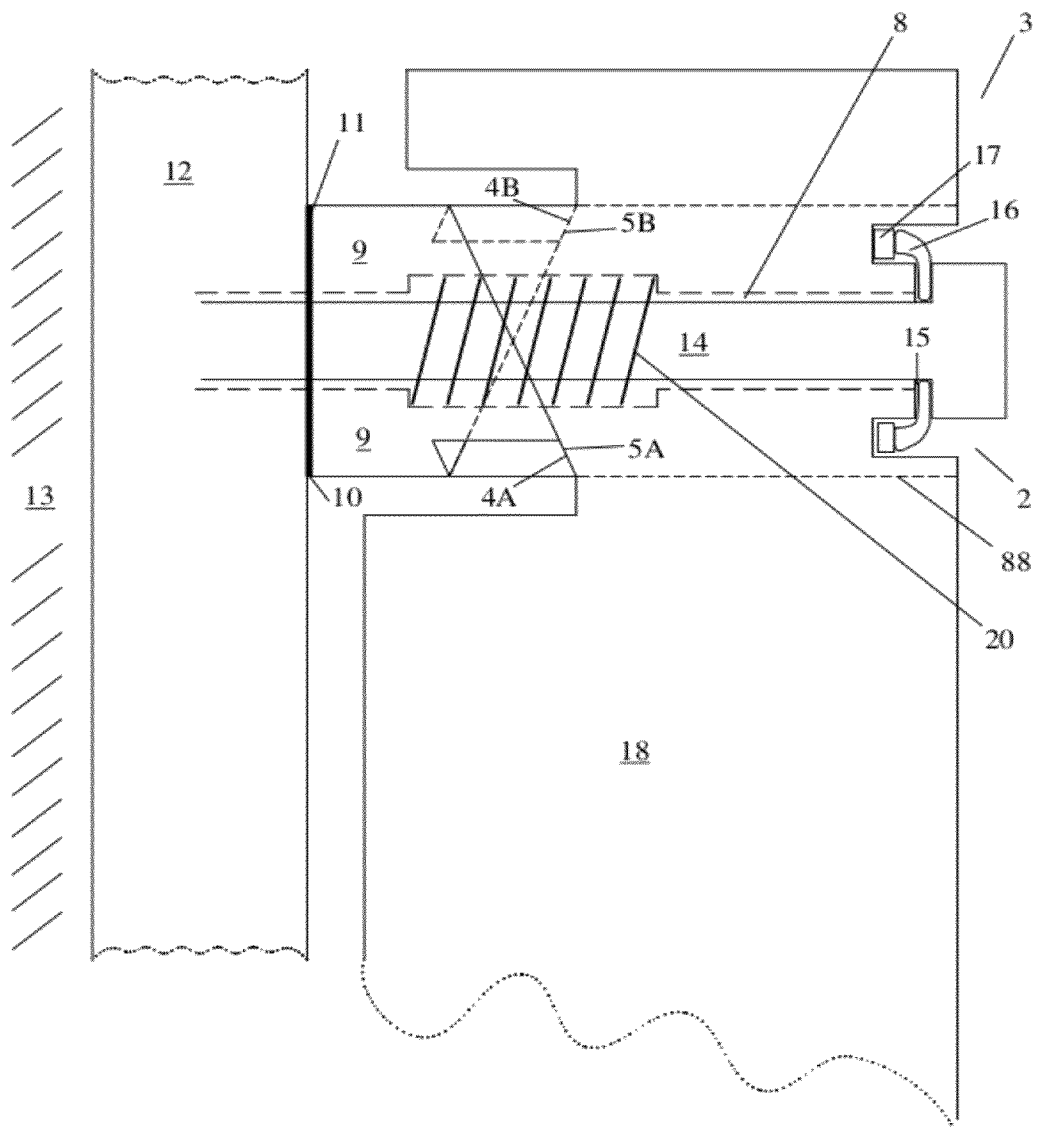

TORQUE BIASED FRICTION HINGE FOR A TENSIONER

REFERENCE TO RELATED APPLICATIONS

This is a divisional patent application of co-pending application Ser. No. 12/278,439, filed Aug. 6, 2008, entitled "TORQUE BIASED FRICTION HINGE FOR A TENSIONER", as a U.S. National Stage under 35 U.S.C. 371 of PCT/US07/60947, filed Jan. 24, 2007, entitled "TORQUE BIASED FRICTION HINGE FOR A TENSIONER", which claims one or more inventions which were disclosed in Provisional Application No. 60/765,777, filed Feb. 7, 2006, entitled "TORQUE BIASED FRICTION HINGE FOR A TENSIONER", Provisional Application No. 60/822,520, filed Aug. 16, 2006, entitled "SELF-ENERGIZING BRAKE FOR A TENSIONER", and Provisional Application No. 60/863,815, filed Nov. 1, 2006, entitled "BLADE TENSIONER WITH OPPOSING SPANS". The benefit under 35 USC §119(e) of the United States provisional applications is hereby claimed, and the aforementioned applications are hereby incorporated herein by reference.

Co-pending application Ser. No. 12/278,439 is also a continuation-in-part patent application of copending PCT application number PCT/US2007/060941, filed Jan. 24, 2007, entitled "BLADE TENSIONER WITH OPPOSING SPANS". The aforementioned application is hereby incorporated herein by reference.

Co-pending application Ser. No. 12/278,439 is also a continuation-in-part patent application of copending PCT application number PCT/US2007/060945, filed Jan. 24, 2007, entitled "SELF-ENERGIZING BRAKE FOR A TENSIONER". The aforementioned application is hereby incorporated herein by reference.

BACKGROUND OF THE INVENTION

1. Field of the Invention

The invention pertains to the field of tensioners. More particularly, the invention pertains to a torque biased friction hinge for a tensioner.

2. Description of Related Art

A blade-type tensioner imparts tension on a chain. A blade-type tensioner generally includes a plastic blade shoe with an arcuately curved chain sliding face, one or more leaf spring-shaped blade springs opposite the chain sliding face, and a metal base that swingably supports a proximal end portion of the blade shoe and slidably supports a distal end portion of the blade shoe.

During operation, a chain slides and travels along the chain sliding face of the blade shoe. A resilient force due to the elastic deformation of the blade shoe and the blade spring is applied to the chain through the blade shoe to maintain proper chain tension.

SUMMARY OF THE INVENTION

A pivot joint for a single blade spring tensioner or double blade spring tensioner generates a biased friction loss at a pivot joint. The friction torque generated in one direction of joint rotation is greater than the friction torque generated in the opposite direction of rotation. In one embodiment, the direction of torque bias at the joints is used to make the damping of the blade spring greater in compression than in extension. High damping in compression and low damping in extension is a desirable characteristic for a tensioner in most applications. The device may be designed to act as a one-way clutch or as a two-way clutch. The device may also be designed to apply large friction torques only when the joint undergoes large amplitude motions (loss of control).

A pivot joint of the present invention includes a pressure plate having a pressure plate surface, a clutch plate, a pivot arm, a pivot pin, and first and second springs. A clutch plate hole extends through the clutch plate. A clutch plate surface is in contact with the pressure plate surface. The clutch plate has at least one inclined clutch contact area opposite the clutch plate surface. The pivot arm has a pivot hole and includes at least one inclined arm contact area in contact with and complementary in shape to the inclined clutch contact area. The pivot pin includes a pivot pin head and a pivot pin shaft extending through the pivot hole and the clutch plate hole and into the pressure plate.

The first spring is mounted on the pivot pin between the pivot pin head and the pivot arm to urge the pivot arm away from the head of the pivot pin and to provide a first spring preload on the pivot arm and the clutch plate. The spring also provides an end gap between the pivot pin head and the pivot arm to be taken up upon tensioning by an increase in a stack height of the clutch plate and the pivot arm around the pivot pin. When the end gap has not been taken up and the pivot arm rotates in a compression direction, the inclined arm contact area rotates around the pivot pin relative to the inclined clutch contact area. Thus the distance between the inclined arm contact area and the pressure plate and the stack height around the pivot pin are increased.

In a first embodiment, a second spring is mounted on the pivot pin. The second spring acts on a surface of the clutch plate to bias the clutch plate toward the pressure plate for providing a second spring preload on the clutch plate. Preferably, a coefficient of friction between the clutch plate and the pressure plate, a coefficient of friction between the inclined clutch contact area and the inclined arm contact area, an angle of inclination of the inclined arm contact area with respect to a plane parallel to the clutch plate surface, the first spring preload, the second spring preload, an active radius of the inclined arm contact area, and an active radius of the clutch plate are chosen such that in pivot arm compression a torque to slip the inclined plane contact area becomes greater than a torque to slip the clutch plate above a critical torque that occurs at a pivot arm displacement greater than a displacement required to take up the end gap. Preferably, a coefficient of friction between the clutch plate and the pressure plate, a coefficient of friction between the inclined clutch contact area and the inclined arm contact area, an angle of inclination of the inclined arm contact area with respect to a plane parallel to the clutch plate surface, the first spring preload, the second spring preload, an active radius of the inclined arm contact area, and an active radius of the clutch plate are chosen such that in pivot arm extension a torque to slip the inclined plane contact area is less than a torque to slip the clutch plate. In one embodiment, a frictional material is located on the clutch plate surface or the pressure plate surface. In another embodiment, the pressure plate surface is formed to change the torque required for rotation of the clutch plate with respect to the pressure plate.

The first spring is preferably a Belleville spring. The inclined clutch contact area is preferably centered about the pivot hole and has a slope running tangential to a constant radius from a center point of the pivot hole. In one embodiment, the pressure plate is mounted to a stationary surface to prevent rotation of the pressure plate relative to the surface.

In one embodiment, the second spring acts on a surface of the pivot arm to bias the clutch plate toward the pressure plate.

In another embodiment, the second spring acts on a surface of the pivot pin to bias the clutch plate toward the pressure plate.

Preferably, a coefficient of friction between the clutch plate and the pressure plate ($\mu_c$), a coefficient of friction between the inclined clutch contact area and the inclined arm contact area ($\mu_R$), an angle of inclination of the inclined arm contact area with respect to a plane parallel to the clutch plate surface ($\theta$), the first spring preload ($F_{S1}$), the second spring preload ($F_{S2}$), an active radius of the inclined arm contact area ($R_R$), and an active radius of the clutch plate ($R_C$) are chosen such that:

$$\frac{F_{S2}}{F_{S1}} > \frac{R_R(\sin\theta + \mu_R\cos\theta) - R_C\mu_C(\cos\theta - \mu_R\sin\theta)}{R_C\mu_C(\cos\theta - \mu_R\sin\theta)}.$$

A tensioner of the present invention is also disclosed. In one embodiment, at least one blade spring is mounted in the tensioner arm, and the distal end portion of the tensioner arm is slidingly received on a sliding surface.

In another embodiment, the distal end portion of the tensioner arm is pivotally attached to a second pivot pin. The tensioner further includes at least one blade spring mounted in the tensioner arm. A second tensioner arm has a proximal end portion pivotally attached to the pivot pin and a distal end portion pivotally attached to the second pivot pin. A wear surface on the second tensioner arm is slidingly received on a sliding surface. The second tensioner arm may serve as the pressure plate for the joint.

In yet another embodiment of the present invention, the pivot joint includes a pressure plate, a clutch plate, a pivot arm, a pivot pin, and a preload spring. The pressure plate has a pressure plate surface. The clutch plate has a clutch plate hole extending through the clutch plate and a clutch plate surface in contact with the pressure plate surface. The clutch plate also has at least one inclined clutch contact area opposite the clutch plate surface. The pivot arm has a pivot hole and includes at least one inclined arm contact area facing and complementary in shape to the inclined clutch contact area. The pivot pin includes a pivot pin head and a pivot pin shaft extending through the pivot hole and the clutch plate hole and into the pressure plate. The preload spring is mounted on the pivot pin between the pivot arm and the clutch plate. The preload spring urges the pivot arm away from the clutch plate and provides a spring preload on the clutch plate. The preload spring also provides a preload gap between the inclined clutch contact area and the inclined arm contact area to be taken up by an increase in a stack height of the clutch plate and the pivot arm around the pivot pin.

In another embodiment of the present invention, the tensioner includes a pressure plate, a clutch plate, a tensioner arm, a pivot pin, and a preload spring. The pressure plate has a pressure plate surface. The clutch plate has a clutch plate hole extending through the clutch plate and a clutch plate surface in contact with the pressure plate surface. The clutch plate also has at least one inclined clutch contact area opposite the clutch plate surface. The tensioner arm for tensioning a chain or belt has a pivot hole at a proximal end portion. The tensioner arm includes at least one inclined arm contact area facing and complementary in shape to the inclined clutch contact area. The pivot pin includes a pivot pin head and a pivot pin shaft extending through the pivot hole and the clutch plate hole and into the pressure plate. The preload spring is mounted on the pivot pin between the pivot arm and the clutch plate and urges the pivot arm away from the clutch plate. The preload spring provides a spring preload on the clutch plate. The preload spring also provides a preload gap between the inclined clutch contact area and the inclined arm contact area to be taken up by an increase in a stack height of the clutch plate and the pivot arm around the pivot pin.

BRIEF DESCRIPTION OF THE DRAWINGS

FIG. 1 shows a single blade spring tensioner in an embodiment of the present invention.

FIG. 2B shows the tensioner of FIG. 2A in a high frictional losses state.

FIG. 3 shows a double blade spring tensioner in an embodiment of the present invention.

DETAILED DESCRIPTION OF THE INVENTION

Figure 2A:
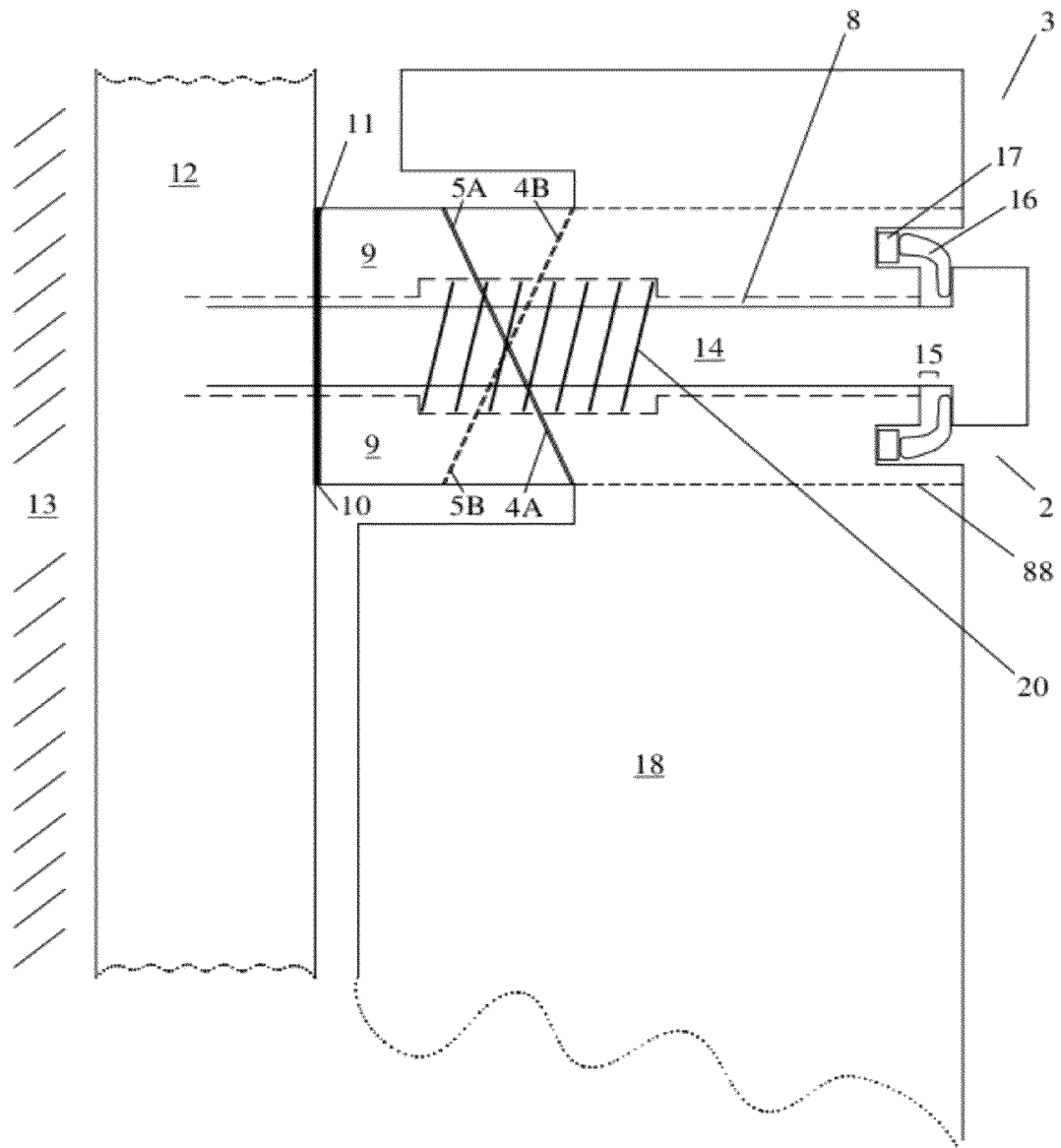
FIG. 2A shows a partial cross-sectional view along lines 2A-2A of FIG. 1.

In a first set of embodiments, a friction hinge of the present invention acts as a two-way clutch. The friction hinge includes a first spring biasing the pivot arm and the clutch toward the pressure plate and a second spring biasing only the clutch toward the pressure plate. For the double spring device, the clutch may slip for an infinite displacement in the high torque direction (compression) at the critical torque value. The double spring device may also slip for infinite displacements in the low torque direction (extension), because the back faces of the ramps collide and allow the clutch to be driven.

In a second set of embodiments, a friction hinge of the present invention acts as a one-way clutch. The friction hinge includes a single spring biasing the pivot arm and the clutch toward the pressure plate. The single spring device has a limited possible displacement in the high torque direction (compression), because the clutch never slips in that direction. The single spring device may slip for infinite displacements in the low torque direction (extension), because the back faces of the ramps collide and allow the clutch to be driven. The rotation in the high torque direction required for the single spring device to bind the pin and generate enough torque to prevent rotation serves as the backlash for the one way clutch device.

Tensioner compression is defined herein as a rotation of the tensioner arm in a direction that reduces chain tension, whereas tensioner extension is defined herein as a rotation of the tensioner arm in a direction that increases chain tension.

In this application, a single blade spring tensioner refers to a tensioner having a single flexible element used to tension a chain drive with one end fixed to ground by a pivot and the other end sliding on a ramp that is fixed to ground. The flexible element preferably has a polymer wear surface and one or more metallic blade springs, although other materials could alternatively be used.

A double blade spring tensioner refers to a tensioner having two opposing flexible elements joined together at each end by pin joints. One of the pin joints allows both elements to rotate relative to ground. The other pin joint is not constrained to ground. In a double blade spring tensioner, one of the wear surfaces contacts the chain, and the other wear surface contacts a ramp that is fixed to ground. The flexible elements in either tensioner include a wear surface connected to one or more blade springs. In a preferred embodiment, the wear surfaces are made of a polymer and the blade springs are metallic, however, other materials known in the art could alternatively be used. In an unconstrained state, each flexible element approximates a constant radius.

In this application, the term "ground" represents a stationary reference frame for the chain drive. Common examples of ground include, but are not limited to, an engine block, a mounting bracket, a transmission case, and a machine frame or case.

Although a friction hinge of the present invention is described for use in a blade tensioner, the present invention is applicable to a pivot for any tensioning arm for tensioning a chain or a belt.

A pivot joint for a single blade spring tensioner or double blade spring tensioner generates a biased friction loss at a pivot joint. The friction torque generated in one direction of joint rotation is greater than the friction torque generated in the opposite direction of rotation. In one embodiment, the direction of torque bias at the joints is used to make the damping of the blade spring greater in compression than in extension. High damping in compression and low damping in extension is a desirable characteristic for a tensioner in most applications. The device may also be designed to apply large friction forces only when the joint undergoes large amplitude motions (loss of control).

The friction joint of the present invention may be used at the pivot end of a single blade spring tensioner or at either pivot on a double blade spring tensioner. In one embodiment, a mating set of inclined planes are arranged on two circular contact areas, however, any number of inclined planes may be used in the present invention. More planes may be used to decrease wear and decrease contact pressures on the hinge. The inclined planes are preferably made of a polymer by injection molding or from a powdered metal (PM). Thus, there is little, if any, cost difference for manufacture with different numbers of inclined planes, but a specific number of inclined planes may be preferable for a specific application. The inclined plane contact areas are centered about a pivot hole in a blade spring flexible element, and the inclined planes in the contact area are arranged with the slope of each plane running tangential to a constant radius from the center point of the pivot hole.

In one embodiment, the inclined plane contact area is preferably a polymer material that is formed during the molding process for the blade tensioner polymer wear surface. In an alternative embodiment, the inclined plane contact area is a metallic material fixed to the tensioner flexible element, and the flexible element is preferably molded directly around the metallic material, which is preferably a powdered metal part. The powdered metal part preferably has spurs around which the flexible element is molded to support torque transfer between the inclined plane contact area and the flexible element.

The second inclined plane contact area is preferably identical and complementary in shape to the first contact area, but the second contact area is preferably on a small cylindrical part that is referred to as the clutch plate herein. The clutch plate is preferably made of a polymer material or a metallic material. In one embodiment, the clutch plate is made from powdered metal (PM) to eliminate the need to perform complicated machining to produce the inclined planes on a metallic part. The clutch plate has a contact area on the side of the cylinder opposite the inclined plane contact area, and this contact area is referred to as the clutch contact area (or clutch plate contact area) herein. The clutch contact area optionally has friction material bonded to the surface. Friction materials include, but are not limited to, paper-based wet clutch materials and brass. The clutch contact area is also optionally textured to alter the frictional properties, as is common industry practice with clutches. For example, the contact area preferably has cross-hatched cuts or grooves in the contact area surfaces of the lubricated parts.

The clutch plate mates with a pressure plate that is preferably either mounted to ground or to another blade spring flexible element (in a joint on a double blade tensioner). The joint is held together with a rigid metallic pin that is long enough to provide a small end clearance in the joint when the pair of inclined planes is fully compressed. The joint end play is preferably sized so that a small relative rotation of the pair of inclined planes takes up the end gap and forces the stack of components to contact the end stops on the pin and directly load the pin in tension. A small relative rotation is consistent with a small arm deflection of one to two millimeters or less, but is dependent on the application.

In the two-spring embodiments, a first preload spring and a second preload spring are preferably placed in the column of components to maintain a nominal preload on the inclined planes and the clutch plate, when the column does not bind directly against the joint pin. The first preload spring urges the tensioner arm and the clutch plate toward the pressure plate. The first preload spring is preferably a Belleville spring. A coil spring or any other device that would place a nominal preload on the frictional plate may alternatively be used. A torsion spring may also be used. A washer is also optionally included with the spring. The second preload spring, preferably a coil spring, urges only the clutch plate toward the pressure plate.

The two preload springs place an initial friction force on the clutch, which is higher than the initial friction force on the inclined planes. The two preloads, in combination with the coefficient of friction between the clutch plate and the pressure plate, the coefficient of friction between the mating inclined plane surfaces, the angle of the inclined planes, and the active radii of the clutch and the inclined planes are preferably selected to meet the following conditions during tensioner compression. At low friction torques, the inclined planes slip before the clutch. At a critical torque, the friction torque on the clutch equals the friction torque on the inclined planes. Above the critical torque, the clutch plate slips. This clutch slipping feature prevents part failure at high compression forces and is used to adjust the coulomb damping of the tensioner.

When the joint rotates in the direction where low frictional losses are desired, the following events preferably occur to generate rotation in the joint with relatively low friction. The joint turns in the direction where the relative motion of the pair of inclined planes reduces the total column height. The flat back sides to the inclined planes collide, causing the flexible element to drive the clutch plate in rotation about the pin. The inclined planes are fully collapsed so that the only normal force between the clutch plate and the pressure plate is the nominal preload generated by the Belleville spring and the second spring. Friction exists in the contact between the clutch plate and the pressure plate, but the torque generated by the friction is relatively low due to the low normal force. The pitch of the inclined planes and the friction properties of the clutch and inclined planes are preferably designed to minimize the tendency of the inclined planes to stick when the direction of rotation changes from high desired friction to low desired friction.

When the joint rotates in the direction where high frictional losses are desired, the following events preferably occur to generate rotation in the joint with relatively high friction. The joint turns in the direction where the relative motion of the pair of inclined planes increases the total column height. The friction joint is preferably designed such that the clutch slips when a desirable or predetermined critical compression force on the hinge is exceeded. When the compression force on the hinge is less than the critical value, the inclined planes rotate and spread apart rather than the clutch plate rotating relative to the pressure plate without spreading the pair of inclined planes. After a small rotation, the inclined planes increase the total column height until all joint end play is removed and the column binds against the ends of the joint pin, loading the pin directly in tension. Further rotation causes the inclined planes and the clutch to act as a self-energizing clutch where great normal forces are generated, placing the joint pin in tension and the part stack column in compression. The high normal forces caused by the self-energizing clutch place a relatively high frictional torque on the joint.

The slope of the inclined planes and the size of the end gap are preferably selected so that the clutch does not self-energize for small joint rotations when the blade spring device is functioning properly and providing adequate tensioning force to control the drive. Under conditions where the blade spring can not control the chain drive, the blade spring deflections are large and the joint rotational motion also increases in amplitude. The clutch self-energizes during blade compression as a result of the large rotational motion at the joint. Properly sizing the end gap and inclined plane characteristics allows the high friction forces to be generated only during running conditions where the additional friction force is actually needed to control the drive. In other words, small deflections are damped completely by the flexible tensioner arm alone without damping by the clutch, and the clutch only activates at large deflections. Creating high friction forces only when needed reduces wear on all parts over the lifetime of the device.

In a two-spring friction hinge of the present invention, the following conditions preferably exist. During compression prior to binding the pin, the required torque to slip the inclined planes is less than the required torque to slip the clutch. For some torque range after the pin binds, the required torque to slip the inclined planes continues to be less than the required torque to slip the clutch. At some point after the pin binds, the required torque for the inclined planes to slip becomes greater than the required torque to slip the clutch. Thus, at torque loads below a critical value, the clutch holds and the inclined planes slide past each other. At the point of critical torque load, the clutch of the friction hinge begins to slip to relieve the torque load and prevent part failure. The angle of the inclined planes, the coefficients of friction for the inclined planes and the clutch, and the active radii of the inclined planes and the clutch are preferably selected to meet these conditions.

FIGS. 1, 2A, and 2B show a single blade tensioner (1) with a pivot joint (2) of the present invention. The single blade tensioner (1) includes an arcuately curved tensioner arm (50) with a distal end (51), a pivoting proximal end (3), and a chain sliding face (52). The proximal end (3) of the arm (50) is pivotally mounted to the ground (13) (i.e., the engine housing or a bracket) by a pin (14). The distal end (51) slides on a ramp (19) that is fixed to ground. Although the ramp (19) is shown as a wedge in the figures, other shapes that allow the tensioner to slide on the ramp are also encompassed by the present invention. The arm (50) contains a blade spring (53) for supporting the chain sliding face (52). Although only one blade spring (53) is shown in the figures, multiple blade springs (53), which are preferably metallic, are alternatively included.

Figure 5A:
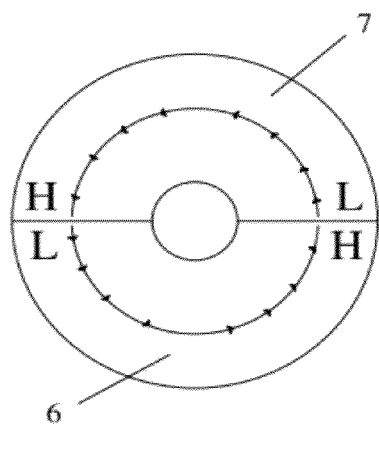
FIG. 5A shows two inclined plane contact areas in one embodiment of the present invention.
Figure 5B:
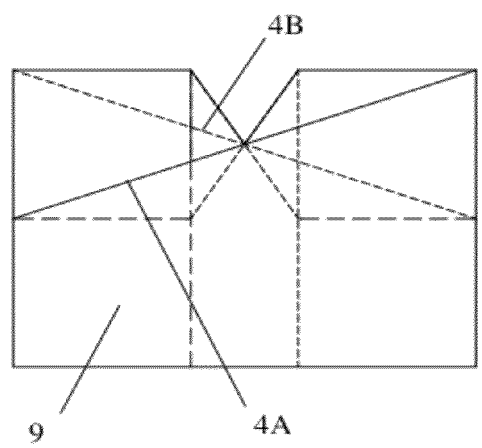
FIG. 5B shows a side view of FIG. 5A.

The friction joint (2) is used at the pivot end (3) of the single blade spring tensioner. FIGS. 1, 2A, and 2B show a mating set of inclined planes (4A), (4B), (5A), (5B) arranged on two semi-circular contact areas, although any number of inclined planes may be used with the single blade spring tensioner (1). FIGS. 5A and 5B show a top view and a side view of the inclined plane contact areas (6), (7) for a clutch plate (9) with two inclined planes (4A), (4B).

Both sets of inclined plane contact areas are centered about a pivot hole (8). One set extends from a blade spring flexible element (18), while the second set extends from the clutch plate (9). The slope of the inclined planes (4A), (4B), (5A), (5B) runs tangential to a constant radius from the center point of the pivot hole (8). The dashed area (88) in FIG. 2A is preferably made of a continuous polymer or a metallic insert molded into the polymer portion of the blade spring. The clutch plate (9) has a clutch contact area (10) on the side of the cylinder opposite the inclined plane contact areas. The clutch contact area (10) optionally has friction material (11) bonded to its surface.

The clutch plate (9) mates with a pressure plate (12). In this embodiment, the pressure plate (12) is mounted to ground (13). The joint is held together with a rigid metallic pin (14) that is long enough to provide a small end clearance in the joint when the pair of inclined planes (4), (5) is fully compressed. The joint end play is preferably sized so that a small relative rotation of the pair of inclined planes (4), (5) takes up the end gap (15) and forces the stack of components to contact the end stops on the pin and directly load the pin in tension. A Belleville spring (16) is preferably included to maintain a nominal preload on the inclined planes (4), (5) and the clutch plate (9) when the column does not bind directly against the joint pin (14). A washer (17) is also optionally included. A coil spring (20) is preferably included to maintain a nominal preload on the clutch plate (9), which is greater than the preload on the inclined planes (4), (5). The coefficient of friction between the clutch plate (9) and the pressure plate (12) and the coefficient of friction between the mating inclined plane surfaces (6), (7) together with the angle of inclination of the planes, the spring preloads, and the active radii of the clutch and the inclined planes help to determine the performance of the friction hinge.

The single blade tensioner (1) is shown in a low frictional losses state in FIG. 2A and a high frictional losses state in FIG. 2B. In FIG. 2A, the end gap (15) is large and the inclined planes (4A), (4B), (5A), (5B) are aligned such that there is contact between complementary vertical surfaces at the high ends of the inclined planes. In FIG. 2B, the stack height has increased, and the end gap (15) has been taken up as rotation of the flexible element (18) inclined planes (5A), (5B) has caused the complementary inclined plane contact areas to come into frictional contact, forcing the flexible element (18) farther away from the pressure plate (12) flattening the Belleville spring (16), and binding the pivot pin (14). FIG. 2A and FIG. 2B are shown from the same perspective of the flexible element (18), making it appear that the clutch plate (9) has rotated. It is important to note, however that it is actually the tensioner arm (50), and hence the flexible element (18), that rotates and the clutch plate (9) and pressure plate (12) remain stationary in going from the state of FIG. 2A to the state of FIG. 2B, unless there is slippage between the clutch plate (9) and the pressure plate (12), in which case the clutch plate (9) rotates as a result of the slippage.

Figure 4:
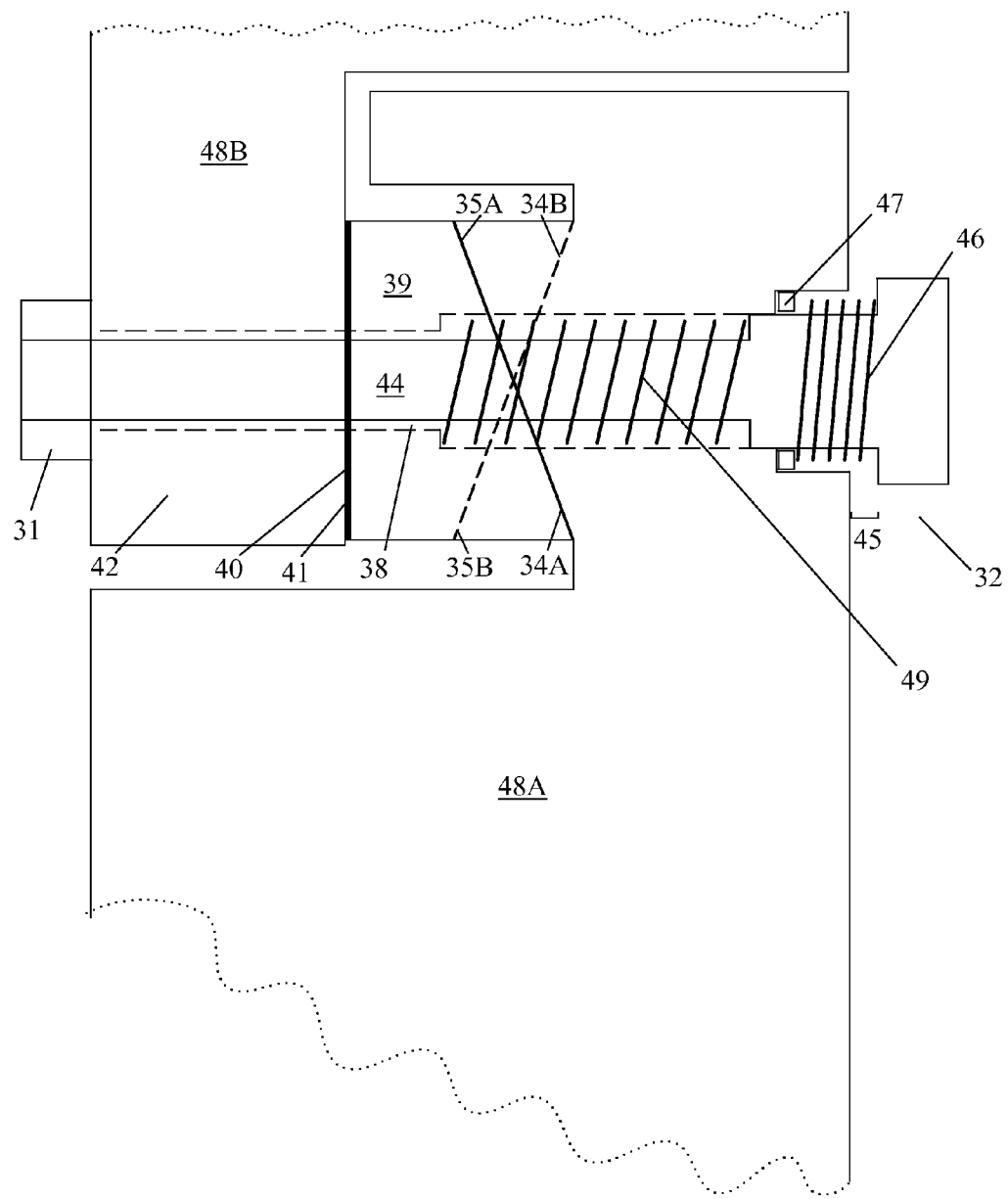
FIG. 4 shows a partial cross-sectional view along lines 4-4 of FIG. 3.

The first preload spring (16) and the second preload spring (20) place a nominal preload on the clutch plate (9), whereas only the first preload spring (16) places a nominal preload on the inclined planes (4), (5). The preload on the clutch plate (9) is therefore greater than the preload the inclined planes (4), (5). In the embodiment of FIG. 2A and FIG. 2B, the first preload spring (16) is shown as a Belleville spring. As shown in the embodiment of FIG. 4, a coil spring or other spring (46) may be used instead of the Belleville spring. In the embodiment of FIG. 2A and FIG. 2B, the second preload spring (20) acts on the clutch plate (9) and the tensioner arm (18) to urge the clutch plate (9) away from the tensioner arm (18). As shown in the embodiment of FIG. 4, the second preload spring (49) may alternatively urge the clutch plate (39) away from the pin (44) by contacting a surface of the pin.

The end gap (15) is typically only present in one direction, except if the rotation is small enough, and then the end gap is present in both directions. Consequently, the only normal forces applied to the clutch are from the Belleville spring (16) and the coil spring (20). Tensioner extension causes the inclined planes (4), (5) to spread, until the end gap (15) is taken up and contact occurs between the tensioner body and the pin (14). This creates high normal forces and high friction torques from the joint (2).

FIGS. 3 and 4 show a double blade tensioner (30) with the pivot joint (32) of the present invention. A tensioner arm (50) contains a blade spring (53) for supporting the chain sliding face (52). Although only one blade spring (53) is shown in each tensioner arm in the figures, multiple blade springs (53), which are preferably metallic, are alternatively included.

Both ends (33A), (33B) of the tensioner (30) are joined together by pin joints. The distal pin joint (36) may be a prior art joint or a friction joint of the present invention. One of the wear surfaces is a chain sliding face (52) that contacts a chain, while the other wear surface (61) contacts a ramp (37) that is fixed to ground. Although the ramp (37) is shown as a wedge in the figures, other shapes that allow the tensioner to slide on the ramp are also encompassed by the present invention. The wear surface (61) slides along the ramp (37).

The friction joint (32) may be at either pivot end (33A), (33B) of the tensioner (30) but is shown at the right pivot end (33A) in the figures. A mating set of inclined planes (34A), (34B), (35A), (35B) is arranged on two semi-circular contact areas, however, any number of inclined planes may be used with the double blade spring tensioner (30). Both sets of inclined plane contact areas are centered about a pivot hole (38). One set extends from a blade spring flexible element (48A). Although the second set preferably extends from the clutch plate (39) as shown in FIG. 4, the second set may extend directly from the second blade spring flexible element (48B) within the spirit of the present invention. The slope of the inclined planes (34A), (34B), (35A), (35B) runs tangential to a constant radius from the center point of the pivot hole (38). The clutch contact area (40) optionally has friction material (41) bonded to the surface.

The clutch plate (39) mates with a pressure plate (42) that is preferably mounted to the second blade spring flexible element (48B). The joint is held together with a pin (44), which is preferably a rigid metallic pin that is long enough to provide a small end clearance in the joint when the pair of inclined planes (34), (35) is fully compressed. The joint end play is preferably sized so that a small relative rotation of the pair of inclined planes takes up the end gap (45) and forces the stack of components to contact the end stops on the pin and directly load the pin in tension. A first coil spring (46) maintains a nominal preload on the inclined planes (34), (35) and the clutch plate (39) when the column does not bind directly against the joint pin (44). In an alternative embodiment, a Belleville spring is used, similar to FIG. 2A. A washer (47) is also optionally included. A second spring (49) is preferably included to maintain a nominal preload on the clutch plate (39), which is greater than the preload on the inclined planes (34), (35). In the embodiment of FIG. 4, the second spring (49) contacts the clutch plate (39) on one end and an expanded part of the pin (44) shaft at the other end. The coefficient of friction between the clutch plate (39) and the pressure plate (42) and the coefficient of friction between the mating inclined plane surfaces, together with the angle of inclination of the planes and the active radii of the clutch and the inclined planes help to determine the performance of the friction hinge.

In the double-blade embodiment, the flexible element (48B) is preferably used as the pressure plate (42). The pressure plate section of the flexible element (48B) is preferably made of a polymer or a metallic section molded into the flexible element (48B). The friction material (41) is preferably applied to the pressure plate (42) or the clutch plate (39).

It is not necessary that the right end (33A) of a double blade tensioner of the present invention be grounded. In a free end pivot embodiment of a double blade tensioner, a pin retainer (31) located at the far end of the pin (44) is not grounded. In an embodiment with the pivot fixed to ground, the retainer (31) represents ground. Additional friction material may optionally be placed between flexible element (48B) and ground.

Figure 6:
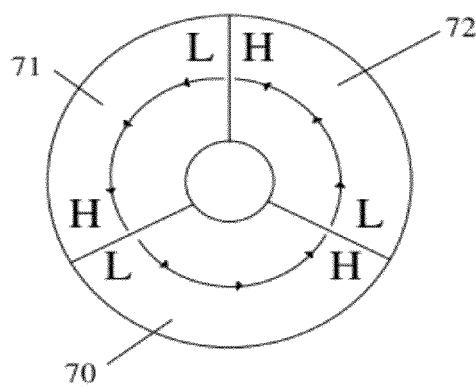
FIG. 6 shows three inclined plane contact areas in an alternative embodiment of the present invention.
Figure 7:
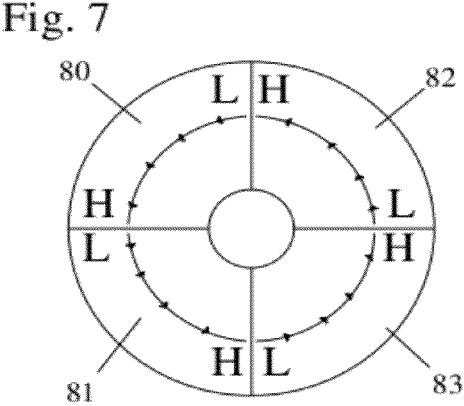
FIG. 7 shows four inclined plane contact areas in an alternative embodiment of the present invention.

Although two inclined planes are shown in the figures discussed thus far, any number of inclined planes may be used. For example, FIG. 6 shows three inclined plane contact areas (70), (71), (72). Each of the contact areas goes from a low incline (L) to a high incline (H). FIG. 7 shows four inclined plane contact areas (80), (81), (82), (83). Each of the contact areas goes from a low incline (L) to a high incline (H). As discussed above, more planes may be used to decrease wear and decrease contact pressures on the hinge. A specific number of inclined planes may be preferable for a specific application. Although a single pair of inclined planes may be used, two or more are preferable so as not to put a moment on the inclined planes and create friction.

Figure 8:
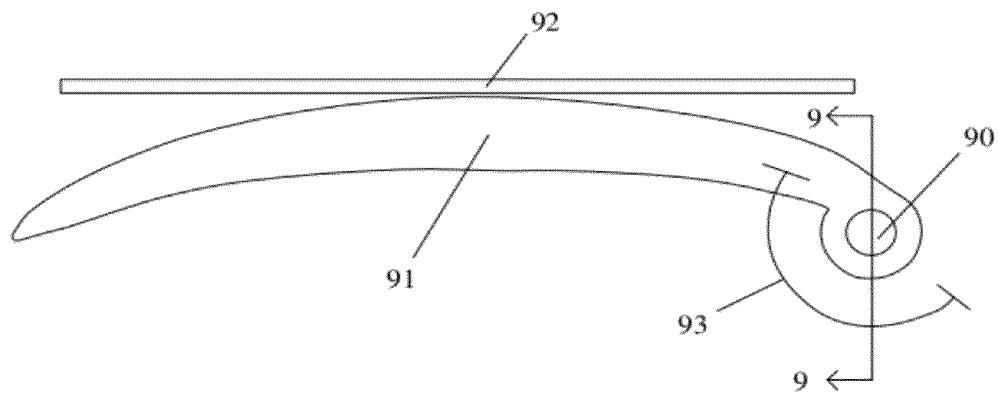
FIG. 8 shows a tensioner in an embodiment of the present invention.
Figure 9:
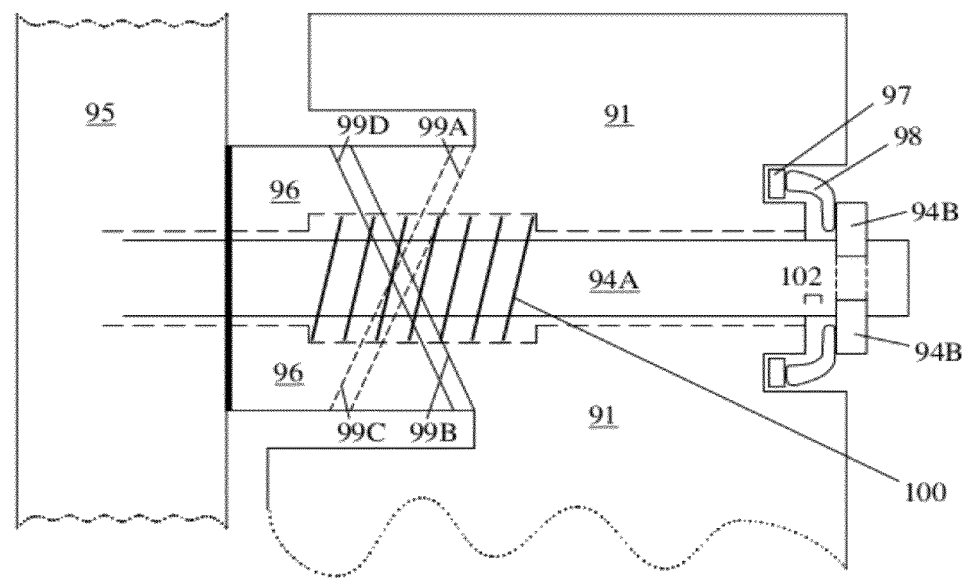
FIG. 9 shows a partial cross-sectional view along lines 9-9 of FIG. 8.

A torque-biased friction hinge of the present invention may be used with any type of tensioning arm. For example, FIGS. 8 and 9 show a pivot joint (90) for a tensioner arm (91). The tensioner arm (91) is biased toward the tensioned device (92) by a tensioner arm biasing device (93). An alternate to the previously-described pivot pin is shown in this embodiment. A dowel pin (94A) serves as the pin shaft and a snap ring (94B) placed around a narrowed portion of the dowel pin (94A) serves as the pin head for this pivot pin. The dowel pin (94A) is preferably grounded in a pressure plate (95). Stacked on the pin (94A) above the pressure plate (95) are a clutch plate (96), the tensioner arm (91), a washer (97), a spring (98) to bias the tensioner arm (91) toward the clutch plate (96) and provide an end gap (102), and the snap ring (94B). A dowel pin and a snap ring may be used interchangeably with a pin with an integral head in any of the embodiments described herein. The tensioner arm (91) and the clutch plate (96) have complementary inclined planes (99A), (99B), (99C), (99D) forming complementary contacting surfaces on the sides facing each other. Although only two sets of inclined planes are shown in FIG. 9, any number of inclined planes may be used in the present invention. A second spring (100) is preferably included to maintain an additional nominal preload on the clutch plate (96).

Figure 10:
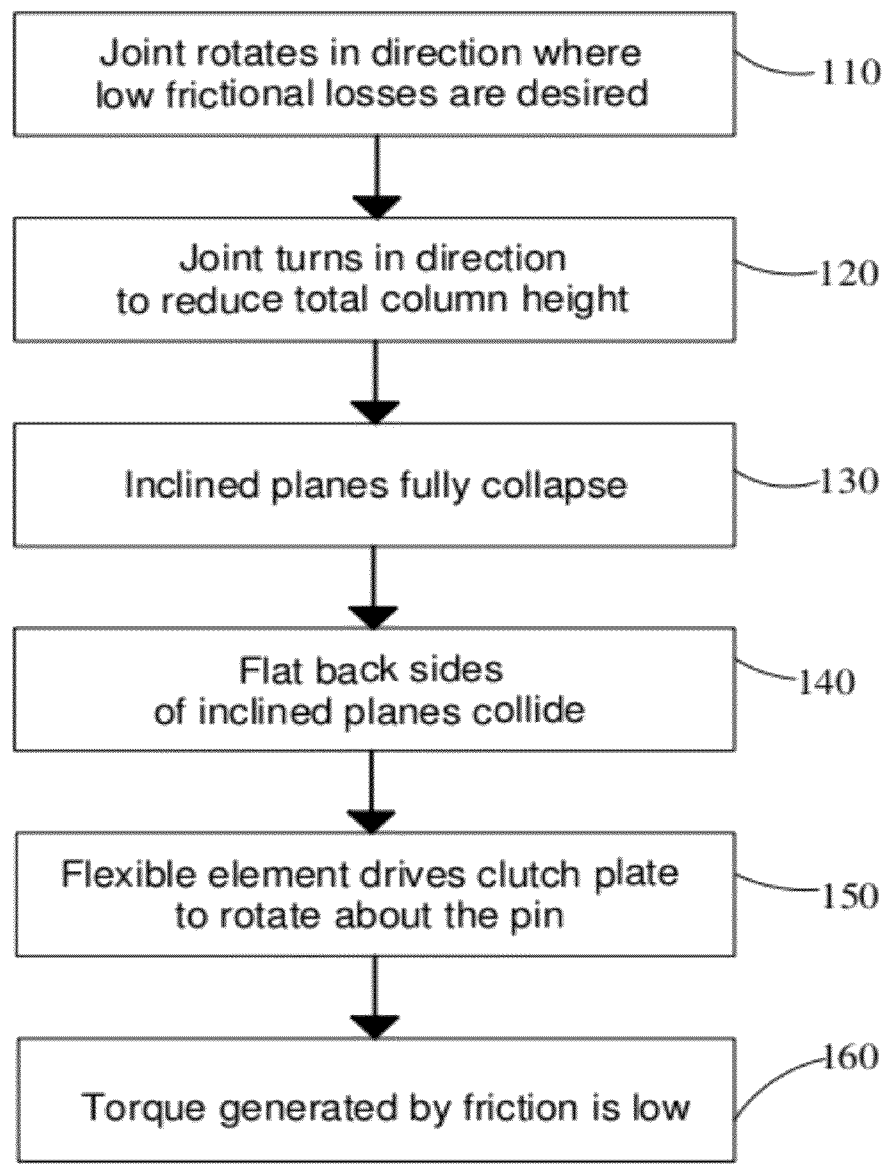
FIG. 10 shows a flowchart of a method of the present invention, which creates low frictional losses.
Figure 11:
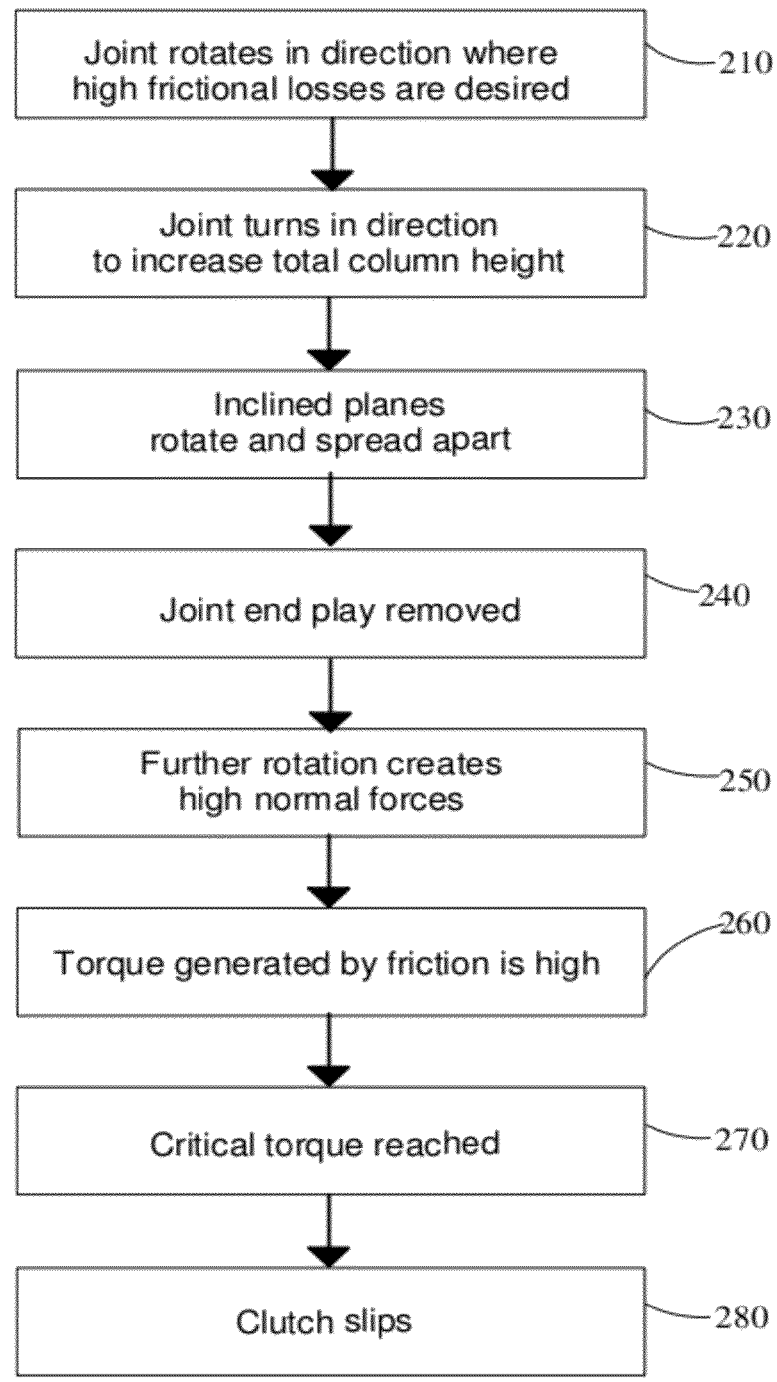
FIG. 11 shows a flowchart of a method of the present invention, which creates high frictional losses.

FIGS. 10 and 11 show flowcharts of methods of the present invention. When the joint rotates in the direction where low frictional losses are desired in step (110), the method generates rotation in the joint with relatively low friction. The joint turns in the direction where the relative motion of the pair of inclined planes reduces the total column height in step (120). The inclined planes are fully collapsed in step (130) so that the normal force between the clutch plate and the pressure plate is determined by the nominal preload generated by the first preload spring and the second preload spring. The flat back sides to the inclined planes collide in step (140), causing the flexible element to drive the clutch plate in rotation about the pin in step (150). Friction exists in the contact between the clutch plate and the pressure plate, but the torque generated by the friction is relatively low due to the low normal force (160). The pitch of the inclined planes and the friction properties of the clutch and inclined planes are preferably designed to minimize the tendency of the inclined planes to stick when the direction of rotation changes from high desired friction to low desired friction.

When the joint rotates in the direction where high frictional losses are desired in step (210), the method generates rotation in the joint with relatively high friction. The joint turns in the direction where the relative motion of the pair of inclined planes increases the total column height in step (220). When the compression force on the hinge is less than the critical, the inclined planes rotate and spread apart rather than the clutch plate rotating relative to the pressure plate without spreading the pair of inclined planes. After a small rotation, the inclined planes increase the total column height in step (230), until all joint end play is removed in step (240), and the column binds against the ends of the joint pin, loading the pin directly in tension. Further rotation causes the inclined planes and the clutch to act as a self-energizing clutch where great normal forces are generated in step (250). The high normal forces caused by the self-energizing clutch results in a relatively high frictional torque on the joint in step (260). If the torque on the hinge is further increased, the friction hinge reaches a critical torque in step (270), where the torque to slip the clutch equals the torque to slip the inclined planes. At torques above the critical torque, the clutch slips in step (280). The self-energizing clutch provides a torque bias, or a large torque or force difference (preferably a factor of 10 to 12) between rotations in one direction compared to rotations in the opposite direction. The values for the torque bias may be tuned based on the specific application and available materials.

Figure 12:
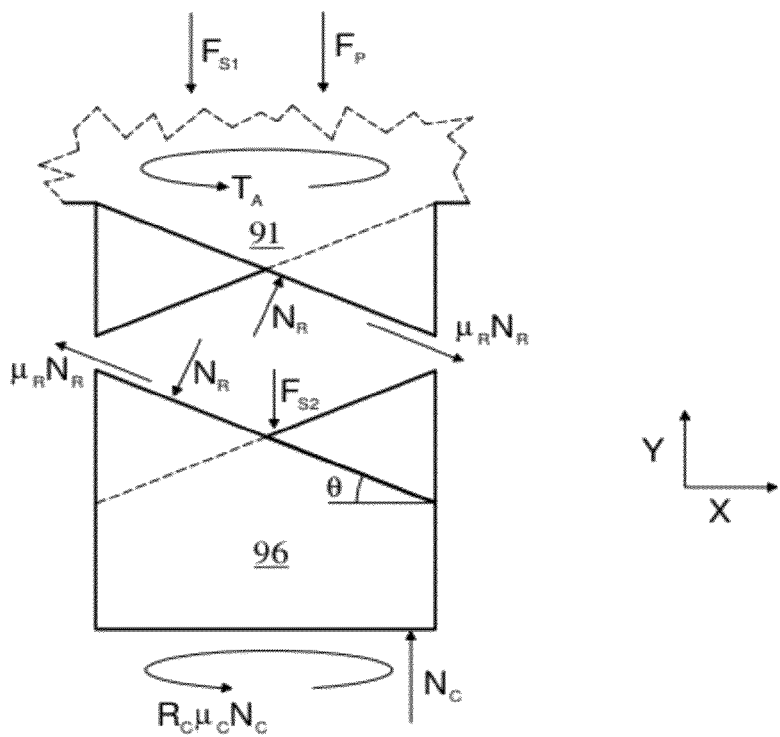
FIG. 12 shows a free body diagram for compression of a friction hinge of the present invention.

Preferred parameters for a friction hinge of the present invention may be determined based on the force and moment balances on the inclined planes and on the clutch as described below. In a preferred embodiment of the present invention, the friction hinge is designed using the following force and moment equations, where:

$T_A$ is the torque applied by the tensioner to the inclined planes
$R_R$ is the active radius of the inclined planes
$R_C$ is the active radius of the clutch
$\mu_R$ is the coefficient of friction of the inclined planes
$\mu_C$ is the coefficient of friction of the clutch
$N_R$ is the inclined plane normal force
$N_C$ is the clutch normal force
$F_P$ is the force from the pin after binding
$F_{S1}$ is the arm preload force
$F_{S2}$ is the clutch preload force
$\theta$ is the incline angle of the inclined planes with respect to a plane parallel to the clutch plate surface Referring to FIG. 12, the above-listed variables are shown in a free body diagram during compression for a tensioner arm (91) and a clutch (96) of the present invention.

The arm preload force ($F_{S1}$) and the clutch preload force ($F_{S2}$) are defined as follows, depending on whether the second preload spring presses against the pin, as in FIG. 4, or against the tensioner arm, as in FIG. 2A, FIG. 2B, and FIG. 9. The arm preload force is the net preload force biasing the tensioner arm against the clutch plate. The clutch preload force is the net preload force biasing the clutch plate against the pressure plate. In the configuration where the second preload spring presses against the pin, the arm preload force is the spring force from the first preload spring, and the clutch preload force is the spring force from the second preload spring.

In the configuration where the second preload spring presses against the tensioner arm, the arm preload force is the difference between the spring force from the first preload spring and the spring force from the second preload spring. The spring force from the first spring is preferably greater than the spring force from the second spring. In this configuration as in the previous configuration, the clutch preload force is the spring force from the second preload spring.

In compression, the following equations are used:

Pivot arm inclined plane force balance:

$$\Sigma \vec{F}_Y = 0 = -F_{S1} - F_P + N_R \cos\theta - \mu_R N_R \sin\theta \quad (1)$$

Pivot arm inclined plane moment balance:

$$\Sigma \vec{M}_O = 0 = T_A + R_R N_R \sin\theta + R_R \mu_R N_R \cos\theta \quad (2)$$

Clutch force balance:

$$\Sigma \vec{F}_Y = 0 = -F_{S2} + N_C + \mu_R N_R \sin\theta - N_R \cos\theta \quad (3)$$

Clutch moment balance:

$$\Sigma \vec{M}_O = 0 = R_C \mu_C N_C - R_R N_R \sin\theta - R_R \mu_R N_R \cos\theta \quad (4)$$

Figure 13:
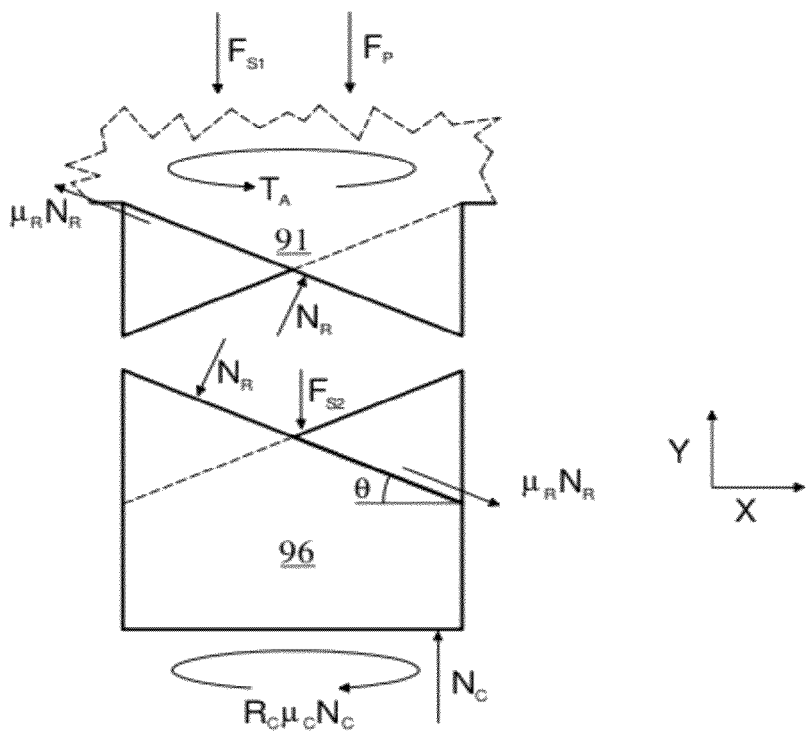
FIG. 13 shows a free body diagram for extension of a friction hinge of the present invention.

Referring to FIG. 13, the above-listed variables are shown in a free body diagram during extension for a tensioner arm (91) and a clutch (96) of the present invention.

In extension before the ramps collide, the following equations are used:

Pivot arm inclined plane force balance:

$$\Sigma \vec{F}_Y = 0 = -F_{S1} - F_P + N_R \cos\theta + \mu_R N_R \sin\theta \quad (5)$$

Pivot arm inclined plane moment balance:

$$\Sigma \vec{M}_O = 0 = T_A + R_R N_R \sin\theta - R_R \mu_R N_R \cos\theta \quad (6)$$

Clutch force balance:

$$\Sigma \vec{F}_Y = 0 = -F_{S2} + N_C - \mu_R N_R \sin\theta - N_R \cos\theta \quad (7)$$

Clutch moment balance:

$$\Sigma \vec{M}_O = 0 = -R_R N_R \sin\theta - R_C \mu_C N_C + R_R \mu_R N_R \cos\theta \quad (8)$$

During compression prior to pin bind, where $F_P=0$, the clutch must not slip so that the inclined planes climb. In order for the hinge to work as described, the following inequality on the clutch moment must be satisfied:

$$\Sigma \vec{M}_O = R_C \mu_C N_C - R_R N_R \sin\theta - R_R \mu_R N_R \cos\theta > 0 \quad (4')$$

Solving for $N_C$:

$$N_C > \frac{R_R N_R (\sin\theta + \mu_R \cos\theta)}{R_C \mu_C} \quad (4'')$$

Also prior to pin bind, $F_P=0$, so:

$$\Sigma \vec{F}_Y = 0 = -F_{S1} + N_R \cos\theta - \mu_R N_R \sin\theta \quad (1')$$

Solving for $N_R$:

$$N_R = \frac{F_{S1}}{\cos\theta - \mu_R \sin\theta} \quad (1'')$$

From the force balance on the clutch:

$$N_C = F_{S2} - \mu_R N_R \sin\theta + N_r \cos\theta \quad (3')$$

Substituting (1") into (3'):

$$N_C = F_{S2} - \frac{\mu_R F_{S1} \sin\theta}{\cos\theta - \mu_R \sin\theta} + \frac{F_{S1} \cos\theta}{\cos\theta - \mu_R \sin\theta} \quad (9)$$

Therefore, in order for the inclined planes to climb without clutch slip prior to pin bind, substituting (9) and (1") into (4"):

$$F_{S2} - \frac{\mu_R F_{S1} \sin\theta}{\cos\theta - \mu_R \sin\theta} + \frac{F_{S1} \cos\theta}{\cos\theta - \mu_R \sin\theta} > \frac{R_R F_{S1}(\sin\theta + \mu_R \cos\theta)}{R_C \mu_C (\cos\theta - \mu_R \sin\theta)} \quad (10)$$

Solving for $F_{S2}/F_{S1}$ and simplifying:

$$\frac{F_{S2}}{F_{S1}} > \frac{R_R(\sin\theta + \mu_R \cos\theta) - R_C \mu_C (\cos\theta - \mu_R \sin\theta)}{R_C \mu_C (\cos\theta - \mu_R \sin\theta)} \quad (10')$$

Therefore, the critical ratio of clutch preload to inclined plane preload is a function of the coefficients of friction and the angle of inclination with respect to a plane parallel to the clutch plate surface.

If $R_R = R_C$, the relationship can be simplified to:

$$\frac{F_{S2}}{F_{S1}} > \frac{(\sin\theta + \mu_R \cos\theta)}{\mu_C (\cos\theta - \mu_R \sin\theta)} - 1 \quad (10'')$$

The critical torque on the friction hinge occurs during compression after pin bind at the critical point where the clutch begins to slip. The terms $F_{S1}$, $F_{S2}$, $\mu_R$, $\mu_C$, $R_R$, $R_C$, and $\theta$ are known parameters for a given friction hinge, and the system of four equations (1), (2), (3), (4) is solved for $T_A$, $N_R$, $N_C$, and $F_P$. Thus the performance of the friction hinge may be fine-tuned for a particular application by selecting the appropriate forces of the preload springs, the frictional coefficients, the active radii of the hinge, and the incline angle of the planes.

Figure 14:
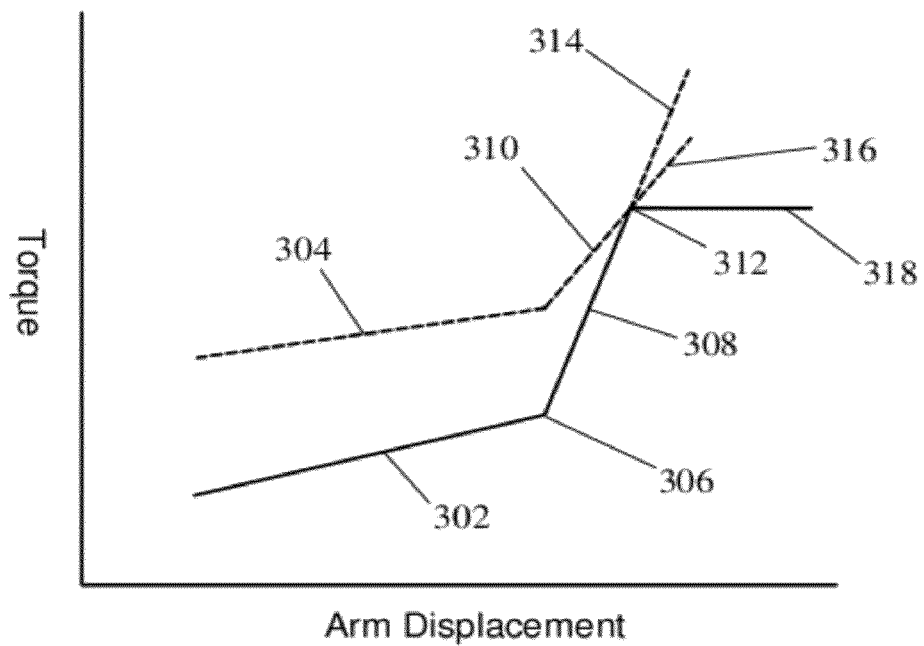
FIG. 14 shows a torque-displacement curve for a friction hinge of the present invention.

A friction hinge of the present invention may operate in three different modes during tensioner compression depending on the torque being placed on it. Referring to FIG. 14, the torque versus arm displacement diagram illustrates these different modes. The torque-arm displacement curve for the inclined planes (302), (308), (314) and the clutch (304), (310), (316) are shown schematically. The spring preload on the friction hinge is designed such that prior to pin bind, the torque (302) required to turn the inclined planes is less than the torque (304) to turn the clutch. At pin bind (306) the slopes of both the inclined plane curve and the clutch curve increase. The inclined plane torque line (308) has a slope greater than the slope of the clutch torque line (310) such that at a critical torque (312), the two lines cross. This is the point at which the clutch begins to slip. At torques above the critical point (312), the inclined plane torque line (314) is higher than the clutch torque line (316), and the clutch slips.

In tensioner compression, the friction hinge follows the path of line (302) to line (308) to line (318). In the first mode, at low compression torques prior to pin bind (302), the tensioner arm turns relatively easily. This torque is referred to below as "unbound torque". In the second compression mode, at higher compression torques (308) after the pin binds, more torque is required to turn the tensioner arm a given amount. This torque is referred to below as "bound torque". In the third compression mode, at very high torques (316) above the critical torque, the clutch slips rather than the inclined planes. The critical torque (312) represents the maximum friction torque that the joint can generate, and further arm displacement produces the horizontal torque curve (318) past the critical point (312). Below the critical point (312) all of the lines are sloped, because the normal force is increasing due to the elastic deformation of the preload springs or the pin as the stack height increases. After the clutch slips, the column height does not increase, so the normal force does not increase. Therefore, the torque generated as the clutch slips is constant.

Following a maximum torque compression event, tensioner extension may go through three different modes. The torque follows a curve similar to curve (308) until the pin is no longer bound. After the pin is unloaded, the torque follows a less steep curve similar to curve (302) until the back sides of the ramps collide. The actual torque values are different in extension than in compression, because the direction of the ramp friction force changes as the direction of rotation changes. After the collision the clutch slips, as the clutch plate and tensioner arm at the joint rotate together. The final torque curve is horizontal, because there is no decrease in stack height as the joint rotates after the planes collide. The normal force remains constant as the clutch slips.

Table 1 shows torque values calculated using equations 1-12 for three different sets of parameters. These values are examples only and serve to illustrate the relationship between the parameters of a friction hinge and its behavior. Any set of parameters that satisfies the previously-described conditions may be used within the spirit of the present invention. As a sign convention for torque, negative torques resist tensioner compression, and positive torques resist tensioner extension. In each of these cases, the inclined planes slip during compression at low torques. Calculated outputs include the unbound torque in compression prior to pin bind, the bound torque in compression to turn the clutch after pin bind (critical torque), the normal force to bind the pin ($F_P$), the ratio of bound to unbound torque during compression, the torque during extension prior to wall collision, the torque during extension after wall collision, the maximum extension torque to unstick the column when the pin is bound, the torque bias between compression and extension for large displacements (bound compression torque/extension torque after collision), the torque bias between compression and extension for small displacements (unbound compression torque/extension torque prior to collision), and the stick bias (full-bound compression torque/unstick torque). The stick bias indicates the likelihood of the inclined planes to stick upon switching from bound tensioner compression to tensioner extension with a larger stick bias indicating a lower stick likelihood. $T_C$ values are torque values for compression, and $T_E$ values are torque values for extension.

TABLE 1

| Parameters | Case 1 | Case 2 | Case 3 |
|---|---|---|---|
| θ (degrees) | 1.0 | 3.0 | 5.0 |
| $\mu_R$ | 0.1 | 0.2 | 0.1 |
| $\mu_C$ | 0.1 | 0.2 | 0.2 |
| $F_{S1}$ (N) | 1.0 | 1.0 | 1.0 |
| $F_{S2}$ (N) | 10 | 15 | 15 |
| $R_R$ (mm) | 10 | 10 | 10 |
| $R_C$ (mm) | 10 | 10 | 10 |
| Calculated Values | | | |
| $T_C$ (N · mm) before pin bind | −1.18 | −2.55 | −2.93 |
| $T_C$ (N · mm) after pin bind | −66.6 | −138.9 | −94.8 |
| $F_P$ (N) | 55.6 | 53.5 | 31.4 |
| $T_{C, bound}/T_{C, unbound}$ | 56.6 | 54.5 | 32.4 |
| $T_E$ (N · mm) before collide | 0.824 | 1.46 | 1.11 |
| $T_E$ (N · mm) after collide | 11 | 32 | 32 |
| $T_E$ (N · mm) after pin bind | 46.7 | 79.6 | 35.8 |
| Torque bias (large displacements) | 6.06 | 4.34 | 2.96 |
| Torque bias (small displacements) | 1.43 | 1.75 | 2.65 |
| Stick bias | 1.43 | 1.75 | 2.65 |

Figure 15:
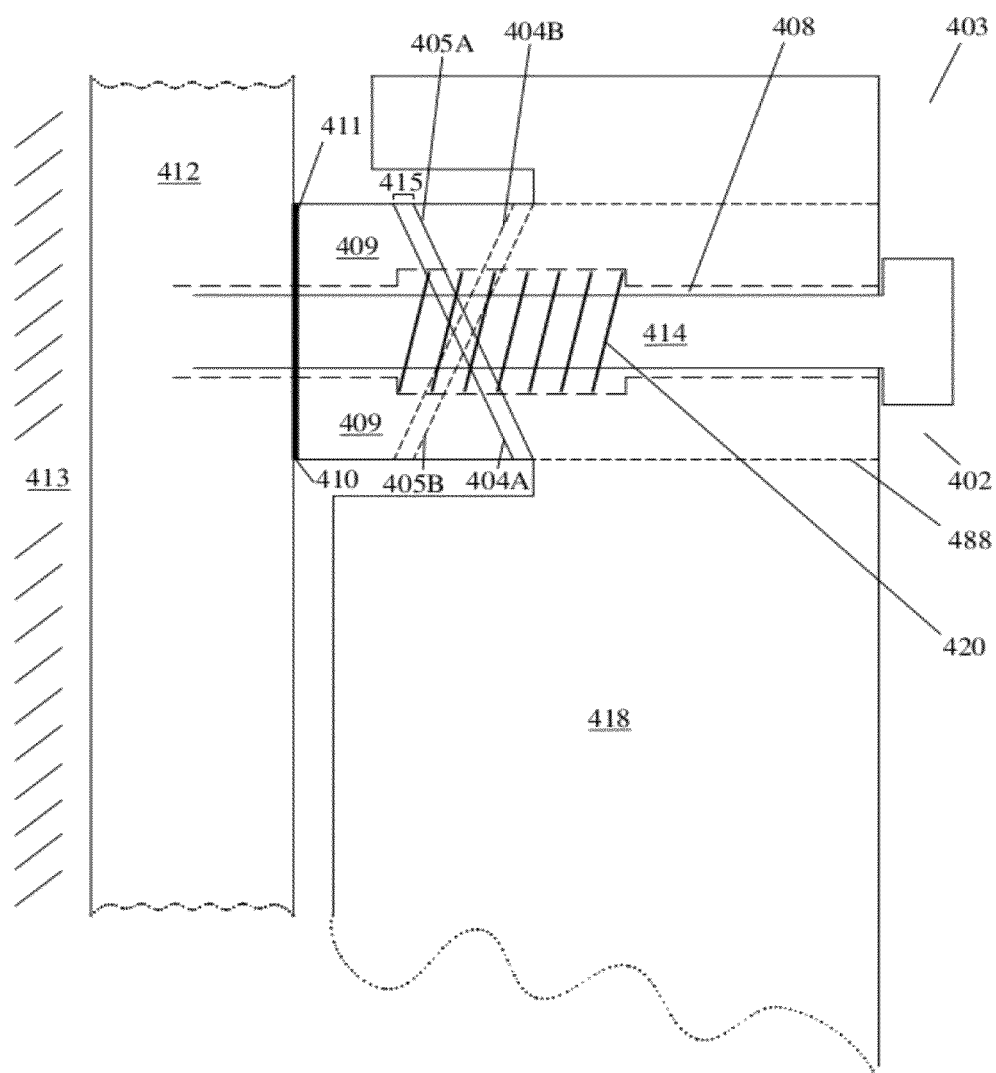
FIG. 15 shows a single-spring two-way clutch in an embodiment of the present invention.

Referring to FIG. 15, a two-way clutch of the present invention may include only one preload spring. The friction joint (402) is used at the pivot end (403) of the tensioner. The pivoting proximal end (403) is pivotally mounted to the ground (413) (i.e., the engine housing or a bracket) by a pin (414). A mating set of inclined planes (404A), (404B), (405A), (405B) are arranged on two semi-circular contact areas, although any number of inclined planes may be used with the tensioner.

Both sets of inclined plane contact areas are centered about a pivot hole (408). One set extends from a tensioner arm (418), while the second set extends from the clutch plate (409). The slope of the inclined planes (404A), (404B), (405A), (405B) runs tangential to a constant radius from the center point of the pivot hole (408). The dashed area (488) in FIG. 2A is preferably made of a continuous polymer or a metallic insert molded into the polymer portion of the tensioner arm. The clutch plate (409) has a clutch contact area (410) on the side of the cylinder opposite the inclined plane contact areas. The clutch contact area (410) optionally has friction material (411) bonded to its surface. The clutch plate (409) mates with a pressure plate (412).

A spring (420) is included to provide a plane gap (415) between the inclined planes (404), (405) and to maintain a nominal preload on the clutch plate (409). The joint is preferably sized so that a small relative rotation of the pair of inclined planes (404), (405) takes up the plane gap (415) and forces the stack of components to contact and directly load the pin in tension. The coefficient of friction between the clutch plate (409) and the pressure plate (412) and the coefficient of friction between the mating inclined plane surfaces together with the angle of inclination of the planes, the spring preload, and the active radii of the clutch and the inclined planes help to determine the performance of the friction hinge.

Figure 16:
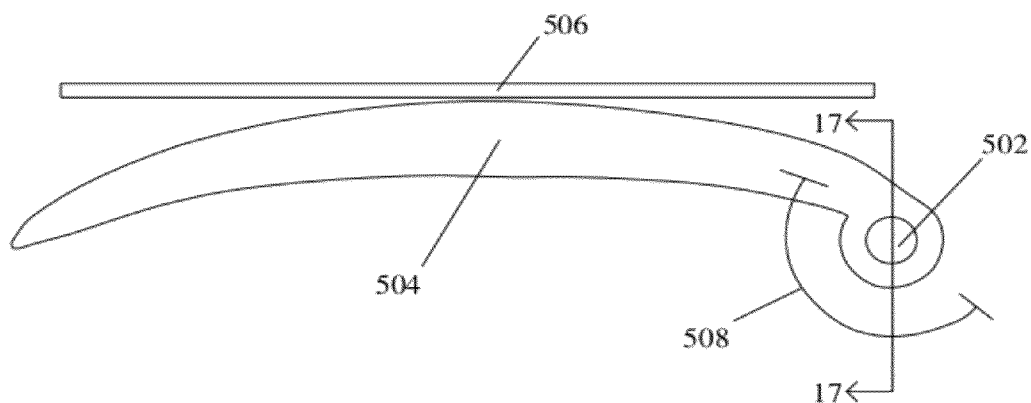
FIG. 16 shows a one-way clutch tensioner in an embodiment of the present invention.
Figure 17:
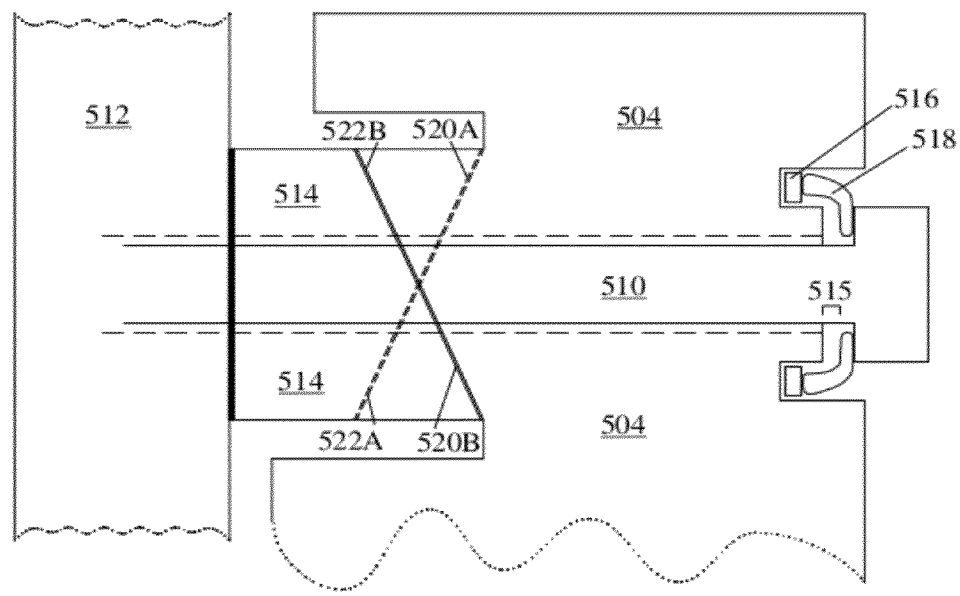
FIG. 17 shows a partial cross-sectional view along lines 17-17 of FIG. 16.

The friction hinges described and shown in FIG. 1 through FIG. 15 act as two-way type clutches, but a friction hinge of the present invention may also be a one-way clutch. FIGS. 16 and 17 show a one-way embodiment of a pivot joint (502) for a tensioner arm (504). The tensioner arm (504) is biased toward the tensioned device (506) by a tensioner arm biasing device (508). The tensioner arm (504) pivots around a pin (510). The pin (510) is preferably grounded in a pressure plate (512). Stacked on the pin (510) above the pressure plate (512) are a clutch plate (514), the tensioner arm (504), and preferably a washer (516) and a spring (518) to bias the tensioner arm (504) toward the clutch plate (514) and provide an end gap (515). The spring (518) is preferably a Belleville spring. The tensioner arm (504) and the clutch plate (514) have complementary inclined planes (520A), (520B), (522A), (522B) forming complementary contacting surfaces on the sides facing each other. Although only two sets of inclined planes are shown in FIG. 17, any number of inclined planes may be used in the present invention.

A one-way clutch friction hinge of the present invention differs in structure from a two-way friction hinge of the present invention in that the one-way hinge does not have a second spring for preloading the clutch plate. A one-way clutch may be used with a single arm tensioner as shown in FIG. 1 or a dual arm tensioner as shown in FIG. 3. The spring (518) may be a coil spring as shown in FIG. 4 or a torsion spring.

Although the one-way clutch hinge is similar in structure with the two-way clutch hinge, it functions differently. The one-way clutch hinge is designed such that the inclined planes slip more easily than the clutch in compression. Since a second preload spring is absent in this embodiment, slippage of the clutch in compression may be prevented by an increased coefficient of friction for the clutch or a decreased coefficient of friction for the inclined planes. As the torque on the hinge increases, the inclined planes continue to slip and the pin becomes bound. In this embodiment, as the compression torque continues to increase, the inclined planes continue to slip until the part fails. The torque to slip the clutch does not become less than the torque to slip the inclined planes in compression, so the clutch does not slip in compression.

For the double spring device, the clutch may slip for an infinite displacement in the high torque direction at the maximum torque value. In contrast, the single spring device has a limited possible displacement in the high torque direction, because the clutch never slips in that direction. However, both devices may slip for infinite displacements in the low torque direction because the back faces of the ramps collide and allow the clutch to be driven. The rotation in the high torque direction required for the single spring device to bind the pin and generate enough torque to prevent rotation serves as the backlash for the one way clutch device.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pivot joint comprising:
   a pressure plate having a pressure plate surface;
   a clutch plate having a clutch plate hole extending through the clutch plate, a clutch plate surface in contact with the pressure plate surface and at least one inclined clutch contact area opposite the clutch plate surface;

a pivot arm having a pivot hole and comprising at least one inclined arm contact area facing and complementary in shape to the inclined clutch contact area;

a pivot pin comprising a pivot pin head and a pivot pin shaft extending through the pivot hole and the clutch plate hole and into the pressure plate; and a preload spring mounted on the pivot pin between the pivot arm and the clutch plate for urging the pivot arm away from the clutch plate, for providing a spring preload on the clutch plate, and for providing a preload gap between the inclined clutch contact area and the inclined arm contact area to be taken up by an increase in a stack height of the clutch plate and the pivot arm around the pivot pin.

2. A tensioner comprising:

a pressure plate having a pressure plate surface;

a clutch plate having a clutch plate hole extending through the clutch plate, a clutch plate surface in contact with the pressure plate surface and at least one inclined clutch contact area opposite the clutch plate surface;

a tensioner arm for tensioning a chain or belt, the tensioner arm having a pivot hole at a proximal end portion and comprising at least one inclined arm contact area facing and complementary in shape to the inclined clutch contact area;

a pivot pin comprising a pivot pin head and a pivot pin shaft extending through the pivot hole and the clutch plate hole and into the pressure plate; and a preload spring mounted on the pivot pin between the pivot arm and the clutch plate for urging the pivot arm away from the clutch plate, for providing a spring preload on the clutch plate, and for providing a preload gap between the inclined clutch contact area and the inclined arm contact area to be taken up by an increase in a stack height of the clutch plate and the pivot arm around the pivot pin.

* * * * *